United States Patent
Sanders et al.

(10) Patent No.: US 9,442,180 B2
(45) Date of Patent: *Sep. 13, 2016

(54) RFID TAG DISTANCE MEASURER

(71) Applicant: Trimble Navigation Limited, Sunnyvale, CA (US)

(72) Inventors: Jeffrey Sanders, San Jose, CA (US); Andrew Ansell, Santa Clara, CA (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,205

(22) Filed: Dec. 22, 2015

(65) Prior Publication Data

US 2016/0116565 A1 Apr. 28, 2016

Related U.S. Application Data

(62) Division of application No. 13/900,953, filed on May 23, 2013, now Pat. No. 9,285,470.

(51) Int. Cl.
| | |
|---|---|
| *G06K 7/00* | (2006.01) |
| *G01S 5/14* | (2006.01) |
| *G01S 5/30* | (2006.01) |
| *G01S 13/08* | (2006.01) |
| *G01S 13/78* | (2006.01) |
| *G01S 13/74* | (2006.01) |
| *G01S 5/02* | (2010.01) |
| *G01S 7/40* | (2006.01) |
| *G06K 19/077* | (2006.01) |

(52) U.S. Cl.
CPC .............. *G01S 5/0252* (2013.01); *G01S 5/14* (2013.01); *G01S 5/30* (2013.01); *G01S 13/74* (2013.01); *G06K 7/0008* (2013.01); *G01S 13/08* (2013.01); *G01S 13/785* (2013.01); *G01S 2007/4065* (2013.01); *G06K 19/0775* (2013.01)

(58) Field of Classification Search
None
See application file for complete search history.

(56) References Cited

U.S. PATENT DOCUMENTS

| | | |
|---|---|---|
| 7,108,177 B2 | 9/2006 | Brookner |
| 7,205,935 B2 | 4/2007 | Sleewaegen |
| 7,511,604 B2* | 3/2009 | Raphaeli ............... G01S 13/758 340/10.1 |
| 7,746,269 B2 | 6/2010 | Kamimura |
| 8,179,231 B1* | 5/2012 | Varahramyan ..... G06K 19/0672 235/492 |
| 8,289,129 B2* | 10/2012 | Bauchot .................. G01S 11/02 340/3.51 |
| 8,432,253 B2* | 4/2013 | Ainsbury .............. G01S 5/0278 340/10.1 |
| 8,559,486 B2 | 10/2013 | Kitayoshi |
| 8,638,255 B2* | 1/2014 | Muehlmann .......... G01S 5/0036 340/10.1 |
| 8,736,482 B2 | 5/2014 | Wu et al. |
| 8,743,006 B2 | 6/2014 | Yoshida et al. |

(Continued)

*Primary Examiner* — Mohamed Barakat
(74) *Attorney, Agent, or Firm* — Kilpatrick Townsend & Stockton LLP

(57) ABSTRACT

A radio frequency identification (RFID) tag distance measuring system and method is disclosed. One example includes a first replica path that receives a signal that is simultaneously transmitted to an RFID tag. The first replica path includes a plurality of taps at known distances along the first replica path. Each of the plurality of taps has a first tap input coupled with the first replica path. In addition, an RFID signal receiver receives a return signal from the RFID tag and provides the return signal along a measurement input, wherein each of the plurality of taps have a second tap input coupled with the measurement path. A distance determiner detects at least the first of the plurality of taps to have an output and determine a distance measurement to the RFID tag based thereon.

10 Claims, 7 Drawing Sheets

(56) References Cited

U.S. PATENT DOCUMENTS

| | | | |
|---|---|---|---|
| 8,779,968 B2 * | 7/2014 | Gravelle | G01S 13/751 340/10.1 |
| 8,934,579 B2 * | 1/2015 | Ward | G01S 5/14 375/145 |
| 2006/0133461 A1 | 6/2006 | Sleewaegen | |
| 2007/0073513 A1 | 3/2007 | Posamentier | |
| 2009/0207022 A1 * | 8/2009 | Reckeweg | G06K 7/0008 340/572.1 |
| 2010/0207730 A1 * | 8/2010 | Boursier | G06K 19/07345 340/10.1 |
| 2010/0245052 A1 * | 9/2010 | Kitayoshi | G06K 19/07749 340/10.4 |
| 2014/0347168 A1 | 11/2014 | Sanders et al. | |

* cited by examiner

RFID TAG DISTANCE MEASURER

CROSS-REFERENCE TO RELATED U.S. APPLICATION

This application is a Divisional application of and claims priority to and benefit of co-pending U.S. patent application Ser. No. 13/900,953 filed on May 23, 2013, entitled "RFID TAG DISTANCE MEASURER," by Jeffrey Sanders, et al., and assigned to the assignee of the present application.

BACKGROUND

Radio frequency Identification (RFID) tags use radio-frequency electromagnetic fields to transfer data from a tag attached to an object. Some RFID tags are powered by the electromagnetic fields used to read them. Other RFID tags include a local power source and modulate reflected radio waves. In some cases, RFID tags may include electronically stored information.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to in this description should be understood as not being drawn to scale.

DESCRIPTION OF EMBODIMENT(S)

Figure 1:
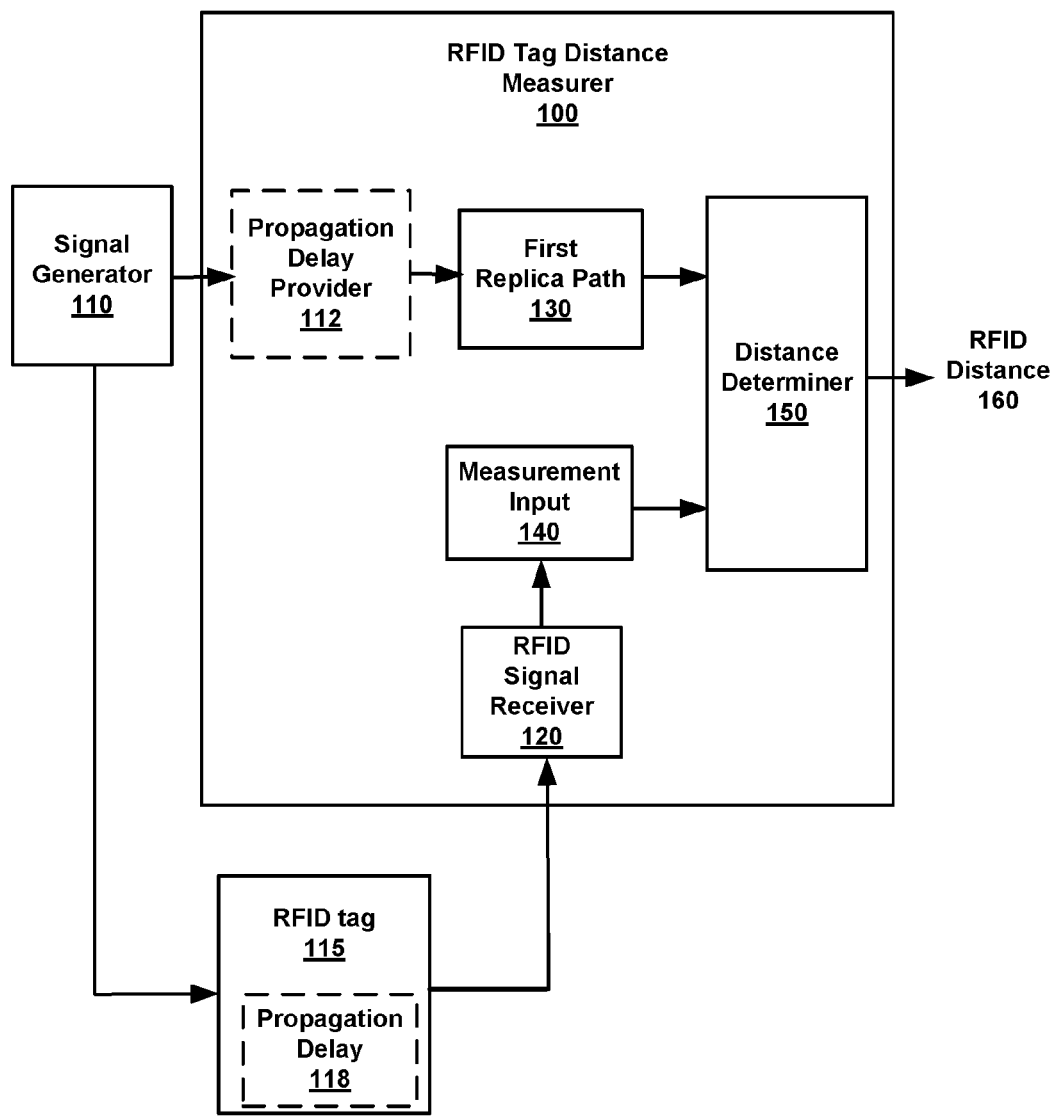
FIG. 1 is a block diagram of an RFID tag distance measurer according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

Embodiments of the present invention provide method and systems for measuring the range to an RFID tag. One embodiment utilizes a measuring device that sends a signal down two paths. The first path includes a wireless transmission to an RFID tag and the second path is a replica. A comparison is then performed between the replica signal traveling a known distance with an incoming signal received from the RFID tag. In one embodiment, time of arrival is approximately equal to twice the range to the specific RFID tag.

In one embodiment, the measuring device includes a replica path that is equivalent to some portion of the range of the RFID tag. For example, if the RFID tag has a range of 30 meters, the replica path may be 60 meters long. In one embodiment, the replica path may be scaled based on the ratio of the speed of light through the replica path and the speed of light through the atmosphere. The replica path may be, but is not limited to, a metallic wire, silicon on a chip, fiber optic and the like.

In one embodiment, taps are used at different distances along the replica path and the spacing of the taps determines the measurement accuracy. For example, taps spaced at 0.1 meter intervals will have more resolution than taps spaced at 1 meter intervals.

In general, a signal is sent out simultaneously through the antenna and along the replica path. As the signal travels through the replica path, taps along the path at specified distances feed the input of comparators. A receive antenna also feeds input into the same comparators. The first comparator with signals on both inputs will be used to determine the distance measurement. In one embodiment, the replica path is not flat but may be folded, rolled or the like.

With reference now to FIG. 1, a block diagram of an RFID tag distance measurer 100 is shown. In one embodiment, RFID tag distance measurer 100 includes a first replica path 130, an RFID signal receiver 120, a measurement input 140 and a distance determiner 150. In one embodiment, RFID tag distance measurer 100 also includes an RFID propagation delay provider 112 to introduce a propagation delay to approximate propagation delay 118 for a specific RFID tag 115 into the first replica path 130. For example, delay provider 112 may include a number of gates to simulate the propagation delay 118. In another embodiment, delay provider 112 may include an RFID tag chip to receive the signal from signal generator 110 which could be programmed to change the signal from signal generator 110 in a manner similar to the way actual RFID tag 115 changes the signal such that the first replica path 130 matches the measurement path 141.

In general, propagation delay 118 refers to the time it takes for an RFID tag 115 to receive the initial signal and then begin reflecting the response. For example, the initial signal is received by RFID tag 115. RFID tag 115 would add its own tag specific information to the signal as it reflects the signal. Thus, the propagation delay 118 is the time from reception to reflection or transmission in an RFID tag. In another embodiment, a calibration mode may be utilized to determine the propagation delay 118. For example, a user could stand at a fixed distance to RFID tag 115 and activate the calibration mode. Given the fixed distance, the unit could determine how much of a propagation delay to use in propagation delay provider 112.

Signal generator 110 simultaneously distributes the signal wirelessly to RFID tag 115 and to the first replica path 130. Although signal generator 110, is shown as distinct from RFID tag distance measurer 100, in another embodiment, signal generator 110 may be incorporated with RFID tag distance measurer 100.

Distance determiner 150 detects at least the first of the plurality of taps to have an output and determines a distance measurement to the RFID tag based thereon.

Figure 2A:
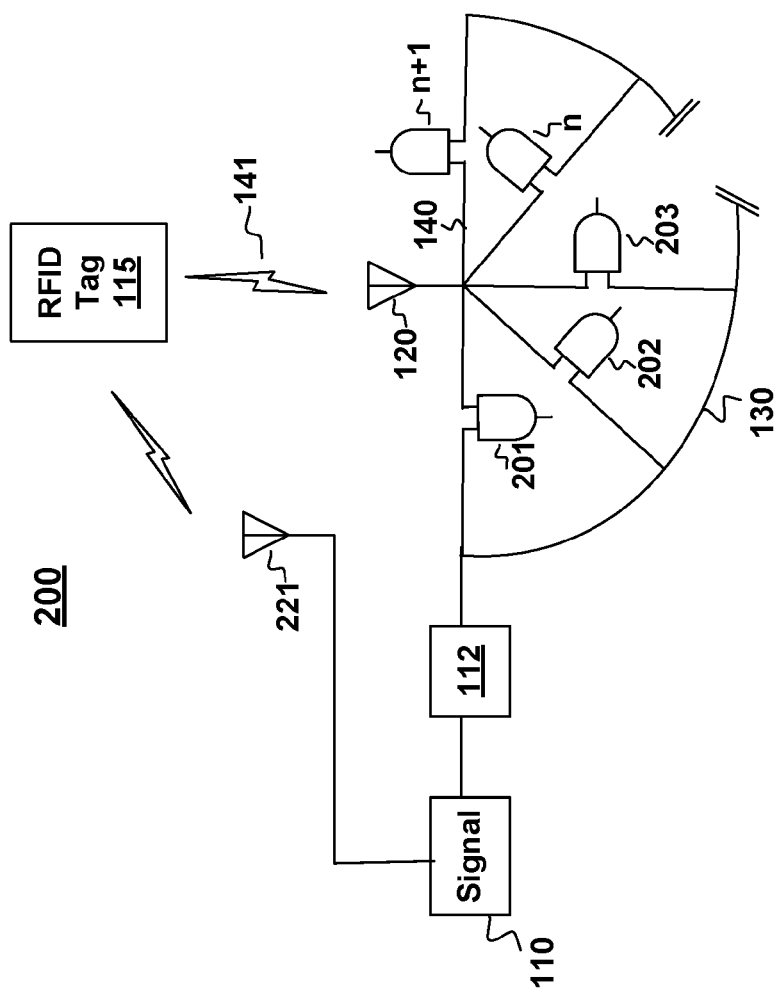
FIG. 2A is a schematic diagram of an RFID tag distance measurer according to one embodiment of the present technology.
Figure 3:
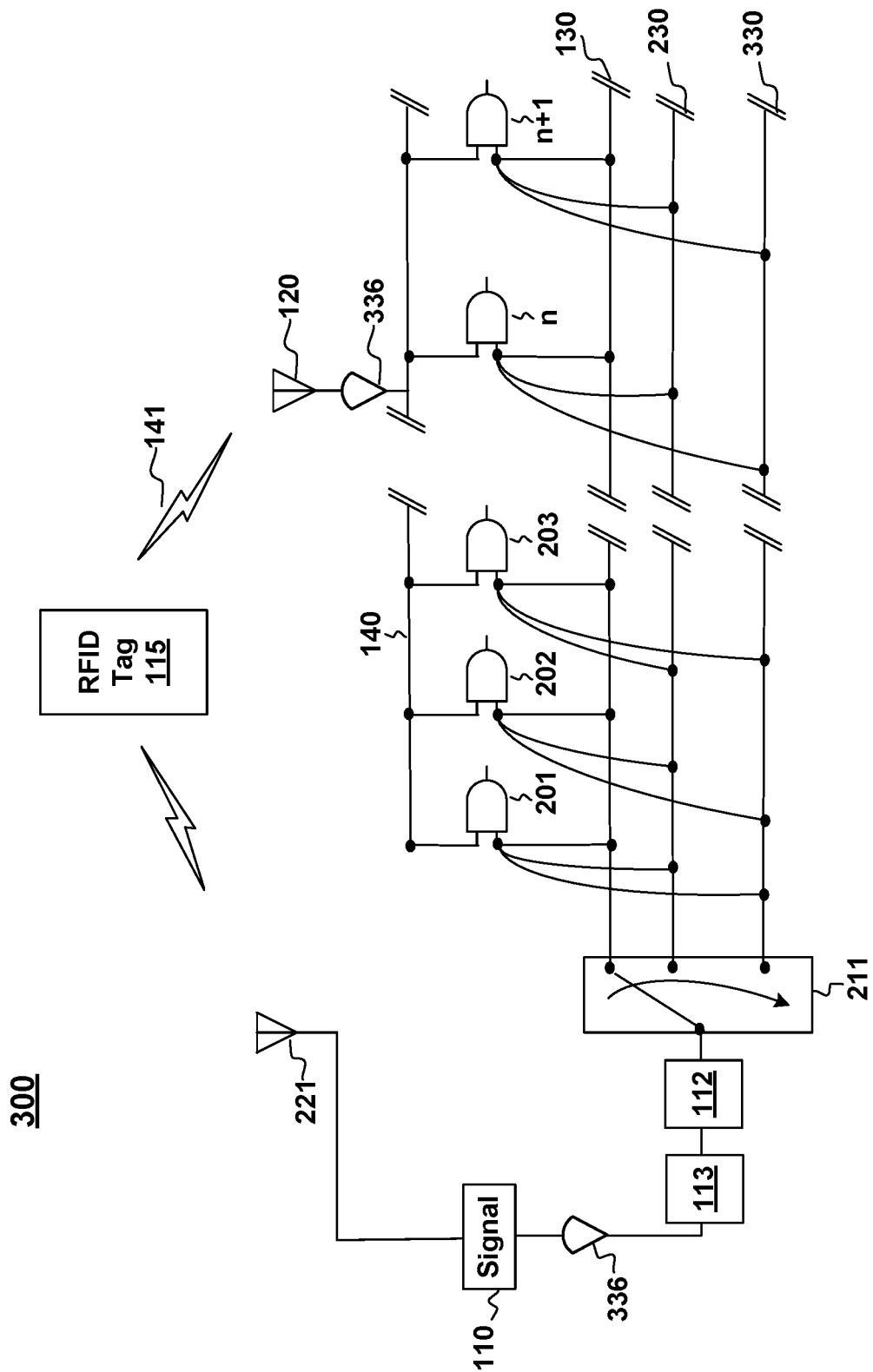
FIG. 3 is a schematic diagram of an RFID tag distance measurer according to one embodiment of the present technology.

Referring now to FIG. 2A, a schematic diagram 200 of an RFID tag distance measurer 100 is shown according to one embodiment of the present technology. FIG. 3 is similar to FIG. 2A and, as such, for purposes of clarity repeated characteristics shown in both FIGS. 2A and 3 will be described in FIG. 2A. In general, FIG. 2A shows a coiled first replica path 130 while FIG. 3 shows a straight first replica path 130.

With reference still to FIG. 2A, diagram 200 includes a signal generator 110, which simultaneously transmits a signal to the first replica path 130 and transmission antenna 221.

First replica path 130 also includes a plurality of taps 201, 202, 203, n, n+1 at known distances along the first replica path 130. In one embodiment, each of the plurality of taps has a first tap input coupled with the first replica path 130.

RFID tag 115 receives the signal from transmission antenna 221 and reflects/transmits a modified signal. RFID signal receiver 120 receives the modified signal from the RFID tag 115 and passes the signal to the measurement inputs 140. In one embodiment, each of the plurality of taps 201, 202, 203, n, n+1 has a second tap input coupled with the measurement path 140.

Figure 2B:
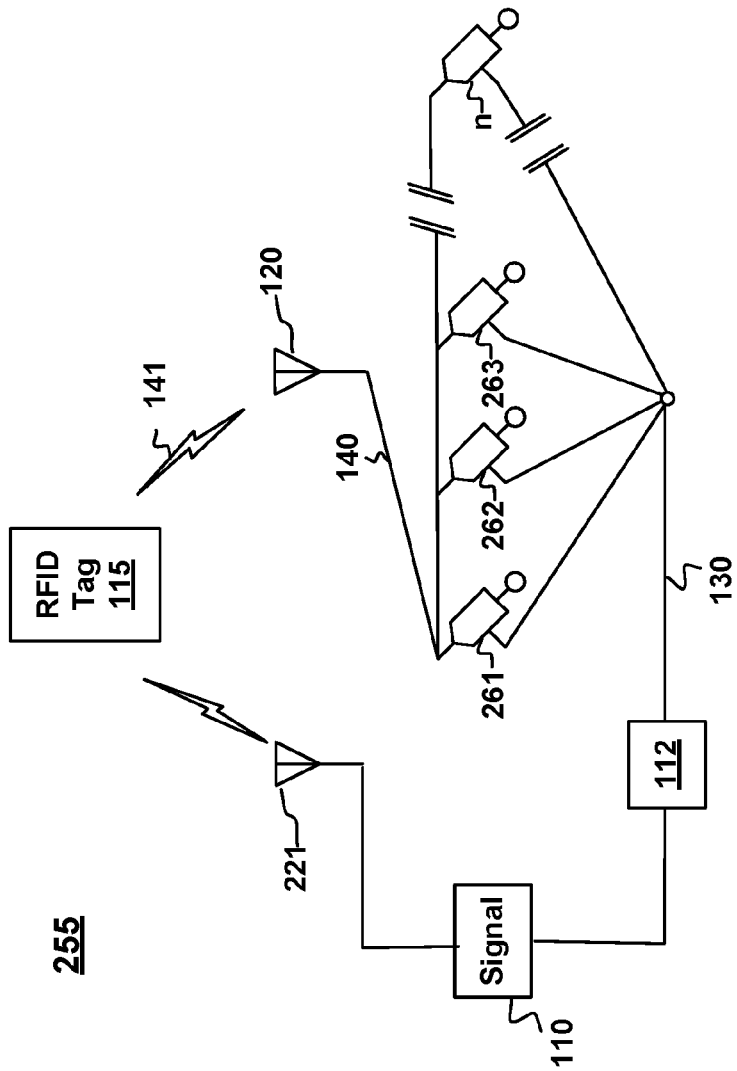
FIG. 2B is a schematic diagram of an RFID tag distance measurer utilizing an analog-to-digital converter (ADC) according to one embodiment of the present technology.

Referring now to FIG. 2B, a schematic diagram 255 of an RFID tag distance measurer utilizing analog-to-digital converters (ADCs) is shown according to one embodiment of the present technology. In general, a comparator will signal a logical "zero" without correlation, and a logical "one" if the two inputs match. As such, the output of the comparator is essentially a 1-bit Analog to Digital Converter (ADC). In contrast, the ADC(s) of FIG. 2B add more resolution by utilizing ADC(s) of more than one bit. In general, this can be done with a bunch of slow ADCs, a single fast ADC or the like.

Diagram 255 includes a signal generator 110, which simultaneously transmits a signal to the first replica path 130 and transmission antenna 221. First replica path 130 also includes a plurality of ADC(s) 261, 262, 263, . . . n at known distances along the first replica path 130. In one embodiment, each of the plurality of ADC(s) has a trigger input coupled with the first replica path 130 and each of the ADC(s) are tied to the same point so they start converting to the digital domain at the same time to provide a snapshot of the whole measurement path.

RFID tag 115 receives the signal from transmission antenna 221 and reflects/transmits a modified signal. RFID signal receiver 120 receives the modified signal from the RFID tag 115 and passes the signal to the measurement inputs 140. In one embodiment, each of the plurality of ADC(s) 261, 262, 263, . . . n also has an input coupled with the measurement path 140. In one embodiment, the inputs are placed at known distances along the measurement path 140.

In general, the ADC(s) parse an input voltage and provide a numerical value representing the voltage level in terms of a number of bits. For example, if the input is a 0.5 v signal, and the ADC(s) input range is 0-1 volt, and the ADC(s) is an 8-bit parsing system [output range 0-255], the output would be the number 128, half of 256.

In one embodiment, input 140 is the signal from antenna 120; the trigger for activating the ADC(s) comes from the common path 130 from the signal generator source 110. In one embodiment, the trigger for activating the ADC(s) happens at the time it takes for the rising edge of the signal to reach the end of the measurement path. For example, if the measurement path is 30 m long, then the ADC(s) are started 60 m (30 m round trip) later. A timer circuit, a wire that is the max length of the measurement, or the like may be used to trigger the ADC(s). The output of the combined ADC(s) generate a wave form representing a digital snapshot of the analog signal at one moment. The samples at different locations along the measurement wire are represented as time in the snapshot. Thus, determining the first rising edge of the return signal will determine the measurement distance.

FIG. 3 is a schematic diagram of an RFID tag distance measurer according to one embodiment of the present technology. As stated herein, for purposes of clarity the discussion will not repeat characteristics shown in both FIGS. 2A and 3, which were described in FIG. 2A. However, although some additional components are shown in FIG. 3, it is appreciated that one or more of the components may be utilized in FIG. 2A or 3 within the scope of the present technology.

In one embodiment, FIG. 3 includes one or more optional line drivers 336. In one embodiment, the line driver 336 may be utilized if an RFID tag is inserted for propagation delay in the replica path circuit because the RFID tag doesn't source enough current to drive the inputs to the comparators. At the same time, a line driver 336 may be used after the signal is received by the antenna. For example, if the first replica path 130 is 60 meters long with many comparator inputs to drive, the signal may need a driver to ensure integrity for all of the inputs of first replica path 130.

FIG. 3 may include at least a second replica path 230. The second replica path 230 is configured with a plurality of the same or different comparators spaced at known distances different than the known distances of the first replica path 130 to provide a different pre-defined level of accuracy to the distance being determined. In other words, one embodiment of multiple replica paths may include each path having its own set of comparators, but in another embodiment, any or all of the comparators may be used with each replica path.

In another embodiment, as shown in replica path 330, the different replica paths may change measurement points that connect to the comparator inputs common to all replica paths. In other words, the intervals may not be constant between the different replica paths using the same comparators. For example, the measurement points of replica path 330 do not correlate with the measurement points of first replica path 130 or second replica path 230. By having different measurement points, the same comparators on the replica path side can be used for each different replica path.

Additionally, the second replica path 230 may utilize the same path as first replica path 130 but may have a different start time, such as a delay or the like to provide different measurement distances without requiring additional comparators. Thus, the first replica path 130 and any additional replica path may refer to physically different paths; different start times for the same path, or a combination thereof.

In one embodiment, a multiplexer 211 is located between the signal generator 110 and the RFID tag replicator/propagation delay circuits 130, 230 and 330. In general, since the signal from signal generator 110 is passed along multiple "replica" paths, the multiplexor 211 can be used to select which replica path to compare the measurement path against.

FIG. 3 also includes the RFID propagation delay provider 112 as similarly described in detail in FIG. 1. In one embodiment, a variable time adjuster 113 may be used to provide a time delay on the signal from signal generator 110 to generate a time-delayed signal that is passed down one or more of the replica paths configured with the plurality of comparators. In so doing, the time-delayed signal provided by variable time adjuster 113 can act as a virtual replica path.

Figure 4:
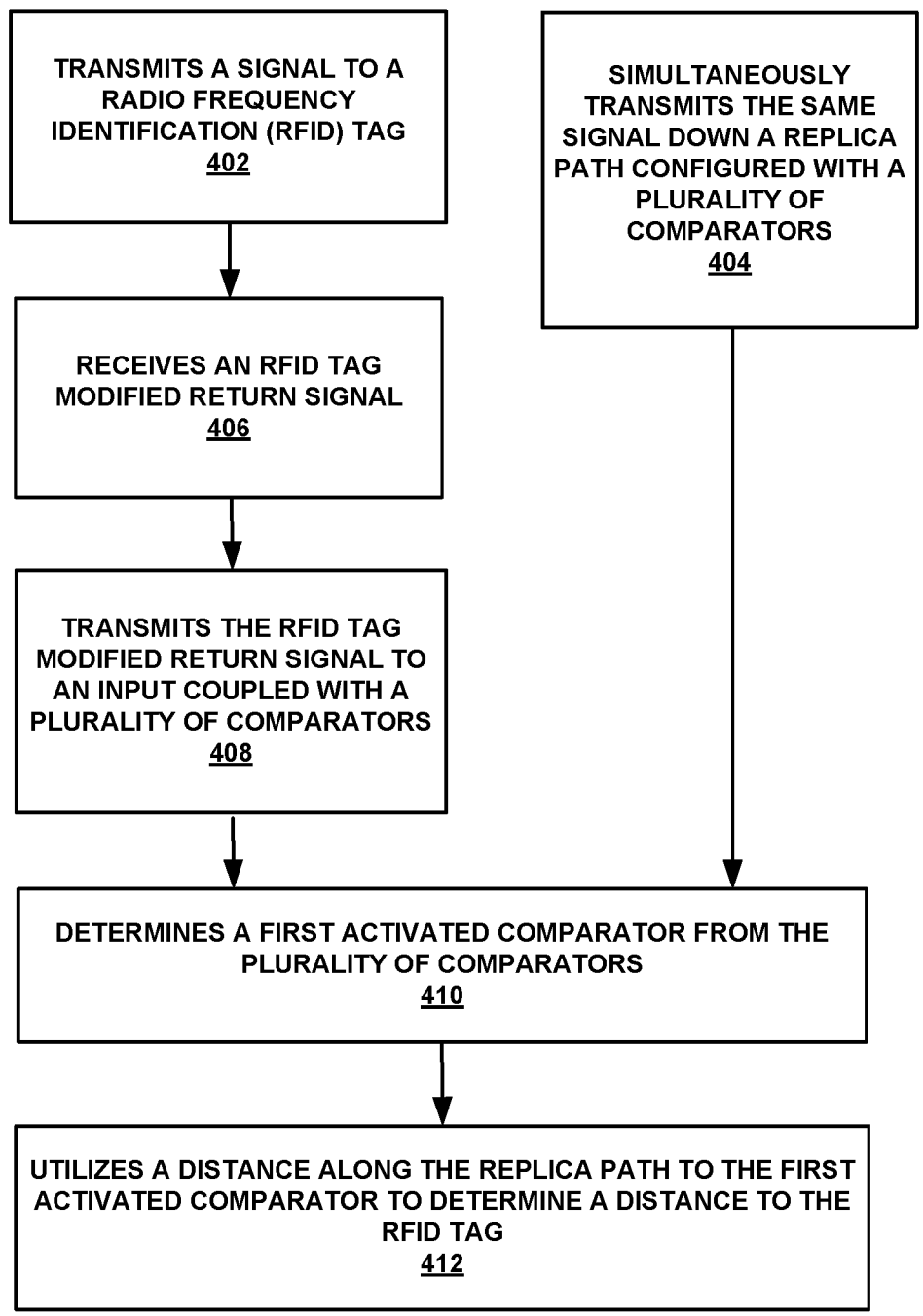
FIG. 4 is a flowchart of a method for electronically measuring distance to an RFID tag according to one embodiment of the present technology.

Referring now to FIG. 4, a flowchart 400 of a method for electronically measuring distance to an RFID tag 115 is shown in accordance with one embodiment.

With reference now to 402 of FIG. 4 and to FIG. 2A, one embodiment transmits a signal to a radio frequency identification (RFID) tag 115. For example, the signal is transmitted from signal generator 110 to RFID tag 115 via transmission antenna 221.

Referring now to 404 of FIG. 4 and to FIG. 2A, one embodiment simultaneously transmits the same signal through a replica path 130 configured with a plurality of comparators 201, 202, 203, n, n+1. In one embodiment, the replica path 130 is a copper wire. In one embodiment, such as shown in FIG. 2A, the path may be coiled to reduce its footprint.

In one embodiment, the replica path 130 is calibrated to account for the time difference between signal travel speed through the atmosphere and signal travel speed through the replica path. For example, if the replica path is copper wire, the replica path may be, for example, 1.5 times longer than the atmosphere path to account for the signal speed in copper vs. atmosphere. In another embodiment, the replica path 130 utilizes an RFID tag replicator to introduce propagation delay 118 for the specific RFID tag 115 being measured.

In another embodiment, the replica path 130 is a silicon approximation such as an application-specific integrated circuit (ASIC). Similarly, the replica path 130 is calibrated to account for the time difference between signal travel speed through the atmosphere and through the silicon as well as for propagation delay 118. In yet another embodiment, replica path 130 may be a field programmable gate array (FPGA). In yet another embodiment, the replica path 130 may be a fiber optic path, or the like.

Referring again to 404 of FIG. 4, the plurality of comparators 201, 202, 203, n, n+1 are at known distances along the replica path 130. By defining the distance between each replica comparator input, a pre-defined level of accuracy for the distance measurement is established. For example, an RFID tag distance measurer 100 with comparators placed at 1 meter intervals along replica path 130 would be less accurate than RFID tag distance measurer 100 with comparators placed at 0.1 meter intervals provided that the measured distance is in the range of the measurement taps. In one embodiment, the intervals do not need to be the same between comparators when the distances to the comparator taps are known.

With reference now to 406 of FIG. 4, one embodiment receives an RFID tag modified return signal. The RFID tag modified return signal is modified from the originally transmitted signal since it will include information from RFID tag 115. The information from RFID tag 115 may include a unique identifier, location information, exit and riser vectors 118, temperature sensors, attitude sensors, and the like.

Referring now to 408 of FIG. 4 and to FIG. 3, one embodiment transmits the RFID tag modified return signal to measurement inputs 140 coupled with the plurality of comparators. In one embodiment, the comparators may be wired-or logic, and-gates, op-amps, and the like.

In another embodiment, at least a second replica path 230 is provided. The second replica path 230 configured with a plurality of comparators spaced at known distances different than the known distances of the first replica path 130 to provide a different pre-defined level of accuracy to the distance being determined. For example, first replica path 130 may have comparators placed at 0.1 meter intervals while the second replica path 230 may have comparators placed at 0.5 meter intervals. However, in another embodiment, the intervals along a replica path do not need to be the same.

One embodiment selectively transmits the signal down either the first replica path 130 or at least the second replica path 230 coupled with the plurality of comparators. For example, the route may be user selected or automatically selected. In another embodiment, the signal is transmitted down both the first replica path 130 and at least the second replica path 230 coupled with the plurality of comparators if the replica paths use different sets of comparators. For example, a coarse measurement can be made which can be used to select a path with a finer measurement. If the coarse measurement says 6 m, the measurement could be repeated down the <10 m path to find out the measurement was actually 6.3 m.

By having a number of different replica paths, RFID tag distance measurer 100 may have a number of settings that may be manually or automatically selected. For example, RFID tag distance measurer 100 may have modes such as: 1-10 meter measurement, 10-30 meter measurement, 30+ meter measurement and the like. By having a number of different modes, the accuracy of RFID tag distance measurer 100 could be adjusted based on situation specific criteria. For example, if the measurements were made between a crane ball and a crane tower, there may not be a need to measure closer than 10 meters. Similarly, if the measurements were made in a room, there may not be a need to measure farther than 10 meters.

By providing adjustable distance applications, the accuracy within a specified range could be increased. For example, if RFID tag distance measurer 100 were set at the >30 meter range, a hybrid silicon/wire replica path may be used to reduce the length of wire needed. In other words, by introducing silicon into the start of the wire replica path, the travel time for the first 30 meters, or whatever desired distance, would be compensated for by the silicon. In so doing, the overall length of first replica path 130 would be significantly reduced.

With reference now to 410 of FIG. 4 and to FIG. 2A, one embodiment determines a first activated comparator from the plurality of comparators. For example, as the signal travels down a replica path 130 each comparator is encountered in sequence. However, the comparator will not provide an output until both inputs are active. In other words, not until both the replica signal and the RFID tag modified return signal are present. In one embodiment, the first comparator to provide an output will be used to determine the distance.

Referring now to 412 of FIG. 4 and to FIGS. 1 and 2A, one embodiment utilizes a distance along the replica path 130 to the first activated comparator to determine a distance to the RFID tag. For example, assume:

The signal traverses first replica path 130 at the approximate rate of 1 foot per nanosecond*⅔ for copper wire and 1 foot per nanosecond for fiber optic cable and a calibrated delay for a silicon path depending on fabrication process; and The first output was from comparator n at 44 nanoseconds.

Distance determiner 150 would determine that 44 nanoseconds correlate to 44 feet along the fiber optic measurement path. Distance determiner 150 would then divide the resultant distance of 44 feet by 2 to account for the round trip travel of the signal to and from RFID tag 115. In so doing, it would be determined that RFID tag 115 was approximately 22 feet away.

Location Example

Figure 5A:
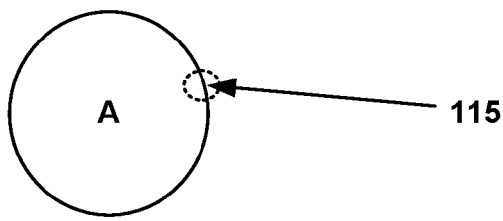
FIG. 5A is an illustration of measuring a distance to an RFID tag according to one embodiment of the present technology.
Figure 5B:
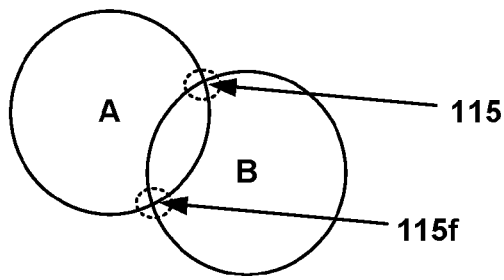
FIG. 5B is an illustration of measuring a distance to two RFID tags according to one embodiment of the present technology.
Figure 5C:
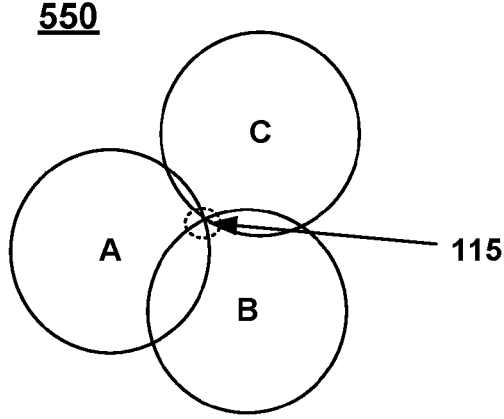
FIG. 5C is an illustration of measuring a distance to three RFID tags according to one embodiment of the present technology.

In the following discussion FIGS. 5A-5C illustrate one way to determine the location of the RFID tag 115 utilizing RFID tag distance measurer 100.

With reference now to FIG. 5A, an illustration 500 measuring a distance to an RFID tag 115 from known location A is shown according to one embodiment of the present technology. In one embodiment, RFID tag distance measurer 100 determines the range to RFID tag 115 from a known point A. For example, RFID tag distance measurer 100 may determine that RFID tag 115 is 10 meters from point A. However, in this example the direction to RFID tag 115 is unknown, therefore, the location of RFID tag 115 could be anywhere on a 360 degree sphere with a radius of 10 meters from point A. In one embodiment, RFID tag distance measurer 100 may determine its location with location systems such as, but not limited to, global navigation satellite systems (GNSS), local NSS, reverse RFID positioning, benchmarks, and the like.

Referring now to FIG. 5B, an illustration 525 measuring a distance to RFID tag 115 from known locations A and B are shown in accordance with one embodiment of the present technology. For example, the RFID tag distance measurer 100 performs a distance measurement to determine that RFID tag 115 is 10 meters away from known point B with one point of ambiguity 115f on a 2-D plane. The 360 degree sphere with a radius of 10 meters from point B is overlaid on the similarly determined sphere generated from point A. At the two measurement level, in 2D the RFID tag 115 could be at one of two locations 115 and 115f (false) as shown in Diagram 525 of FIG. 5B by the two intersections of the radial distances from points A and B.

With reference now to FIG. 5C, an illustration 550 measuring a distance to RFID tag 115 from known locations A, B, and C are shown in accordance with one embodiment of the present technology. For example, the RFID tag distance measurer 100 performs a distance measurement to determine that RFID tag 115 is 10 meters away from known point C. The 360 degree sphere with a radius of 10 meters from point C is overlaid on the similarly determined sphere generated from points A and B. In so doing, the 2-dimensional location of RFID tag 115 can be determined. Although FIGS. 5A-5C show an increase from one to three measurement locations, it should be understood that the process can additionally be performed from four or more different locations having spatial diversity to determine the location of RFID tag 115 in 3-dimensional space.

In another embodiment, the location of the RFID tag distance measurer 100 is determined by keeping RFID tag distance measurer 100 in the same location and determining the distance to one or more RFID tags 115 that are in known locations, acting like pseudo positioning satellites. For example, the RFID tag 115 may include location coordinates in the return signal, may be in a known location, may have its location coordinates stored in a database that can be accessed, or the like.

Computer System

Figure 6:
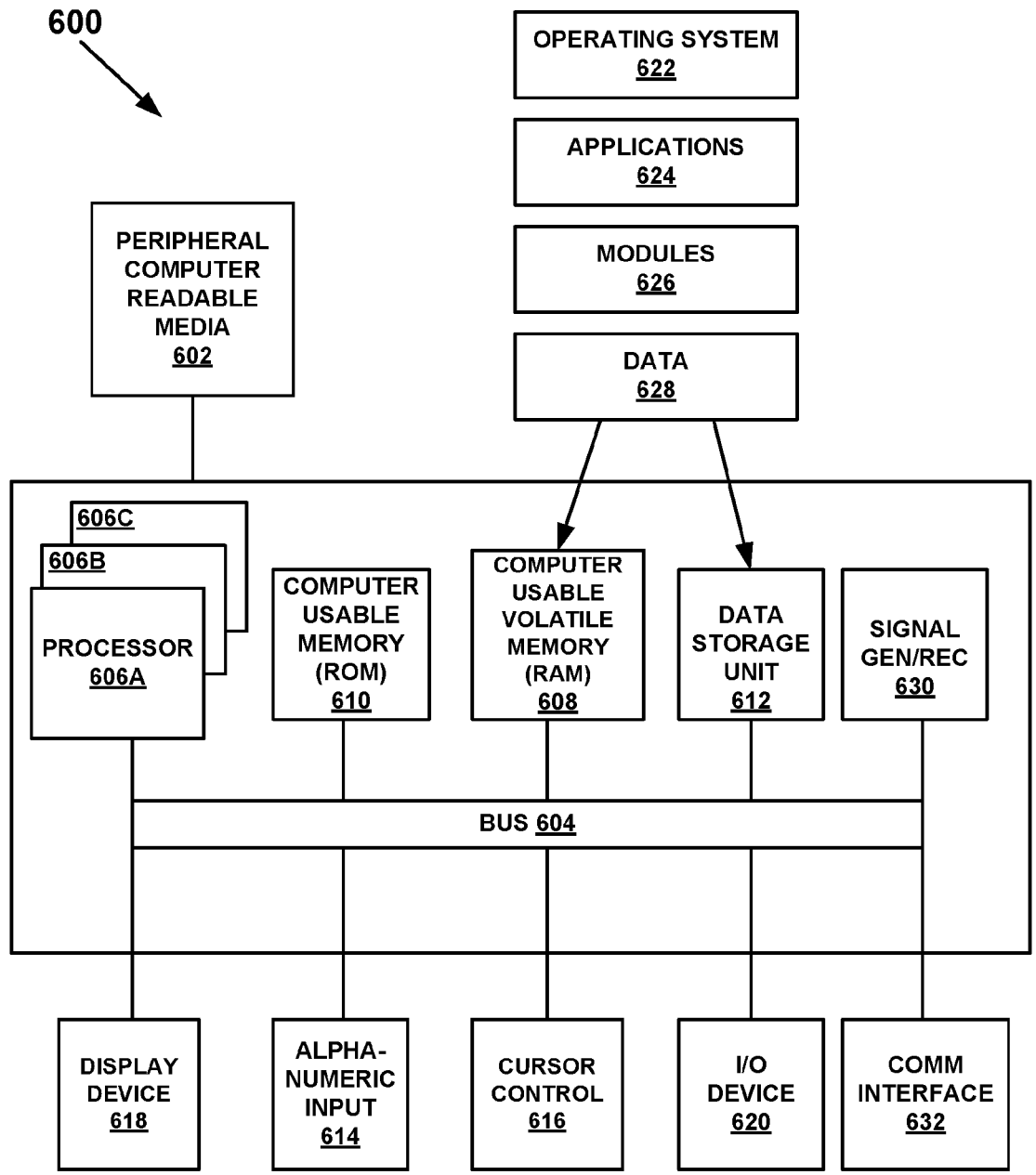
FIG. 6 is a block diagram of an example computer system upon which embodiments of the present technology may be implemented.

With reference now to FIG. 6, portions of the technology for providing a communication composed of computer-readable and computer-executable instructions that reside, for example, in non-transitory computer-usable storage media of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components of FIG. 1 or FIG. 3 may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a floppy disk, a compact disc, a flash drive, and the like coupled thereto.

System 600 of FIG. 6 includes an address/data/control bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM), coupled to bus 604 for storing information and instructions for processors 606A, 606B, and 606C.

System 600 also includes computer usable non-volatile memory 610, e.g. read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. System 600 of the present embodiment also includes an optional display device 618 coupled to bus 604 for displaying information.

Referring still to FIG. 6, optional display device 618 of FIG. 6 may be a liquid crystal device, cathode ray tube, OLED, plasma display device or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet or intranet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within RAM 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface 632 may include a serial port, parallel port, Universal Serial Bus (USB), Ethernet port, Bluetooth, thunderbolt, near field communications port, WiFi, Cellular modem, or other input/output interface. Communication interface 632 may physically, electrically, optically, or wirelessly (e.g. via radio frequency) couple system 600 with another device, such as a cellular telephone, radio, or computer system.

The computing system 600 is only one example of a suitable computing environment and is not intended to suggest any limitation as to the scope of use or functionality of the present technology. Neither should the computing environment 600 be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for electronically measuring distance to an RFID tag, the method comprising:
   transmitting a signal to a radio frequency identification (RFID) tag;
   simultaneously transmitting the same signal down a replica path configured with a plurality of comparators;
   receiving an RFID tag modified return signal;
   transmitting the RFID tag modified return signal to the plurality of comparators;
   determining a first activated comparator from the plurality of comparators; and
   utilizing a distance along the replica path to the first activated comparator to determine a distance to the RFID tag, wherein the plurality of comparators are located at known distances to provide a pre-defined level of accuracy to the distance being determined.

2. The method of claim 1 further comprising:
   utilizing a copper wire as the replica path calibrated to account for a time difference between signal travel speed through the atmosphere and through the copper wire.

3. The method of claim 2 further comprising:
   coiling the copper wire to reduce a footprint of the copper wire.

4. The method of claim 1 further comprising:
   utilizing a fiber optic cable as the replica path, calibrated to account for a time difference between signal travel speed through the atmosphere and through the fiber optic cable.

5. The method of claim 4 further comprising:
   coiling the fiber optic cable to reduce a footprint of the fiber optic cable.

6. The method of claim 1 further comprising:
utilizing silicon as the replica path calibrated to account for a time difference between signal travel speed through the atmosphere and through the silicon.

7. The method of claim 1 wherein the replica path comprises a hybrid cable formed via combination of at least two different materials from the group consisting of: silicon, copper and fiber optic cable; that has been calibrated to account for a time difference between signal travel speed through the atmosphere and the hybrid cable.

8. The method of claim 1 further comprising:
providing at least a second replica path configured with the plurality of comparators at known distances different than the known distances of the plurality of comparators of the replica path; and
selectively transmitting the signal on either the replica path or at least the second replica path coupled with the plurality of comparators.

9. The method of claim 1 further comprising:
providing at least a second replica path configured with the plurality of comparators at known distances different than the known distances of the plurality of comparators of the replica path; and
transmitting the signal down on the replica path and at least the second replica path coupled with the plurality of comparators.

10. The method of claim 1 further comprising:
utilizing a time delay on the signal to generate a time-delayed signal;
transmitting the time-delayed signal down the replica path configured with the plurality of comparators, the time-delayed signal acting as a virtual second replica path;
determining a first activated comparator from the plurality of comparators; and
utilizing a distance along the virtual second replica path to the first activated comparator to determine a distance to the RFID tag.

* * * * *